United States Patent [19]

Katsumoto et al.

[11] Patent Number: 4,839,005
[45] Date of Patent: Jun. 13, 1989

[54] ELECTROLYTIC-ABRASIVE POLISHING METHOD OF ALUMINUM SURFACE

[75] Inventors: Kenichi Katsumoto, Ashiya; Shigeo Isoda, Nagoya; Takahiro Yuuki, Kobe; Shiro Koike, Kobe; Yutaka Yamamoto, Kobe; Suguru Motonishi, Akashi; Tadashi Kawaguchi, Kobe; Tetsuya Gotoh, Kobe; Shiro Horiguchi, Hyogo, all of Japan

[73] Assignee: Kabushiki Kaisha Kobe Seiko Sho, Kobe, Japan

[21] Appl. No.: 187,464

[22] Filed: Apr. 28, 1988

[30] Foreign Application Priority Data

May 22, 1987 [JP] Japan .................. 62-126330

[51] Int. Cl.$^4$ .................. B23H 5/06; B23H 5/14
[52] U.S. Cl. .................. 204/129.46; 204/217
[58] Field of Search .................. 204/129.46, 217

[56] References Cited

U.S. PATENT DOCUMENTS 2,539,455  1/1952  Mazia .................. 204/129.46
4,609,450  9/1986  Seimiya et al. .................. 204/217

FOREIGN PATENT DOCUMENTS 2094224  4/1987  Japan .................. 204/129.46

Primary Examiner—Donald R. Valentine
Attorney, Agent, or Firm—Oblon, Fisher, Spivak, McClelland & Maier

[57] ABSTRACT

In a method of fabricating an aluminum surface for applying mirror-smooth fabrication to the surface of aluminum or aluminum alloy by combining an electrolytic anode dissolving effect to the surface and a polishing effect of removing the protruded portions of passivated films formed on the surface to be fabricated by lapping with abrasive grains, the voltage between the aluminum material and the tool electrode is set within 2.1±0.3 V, an electrolyte at less than 10% concentration is used as a passivation type electrolyte, the urging pressure of the tool electrode to the surface is set to less than 2.0 kgf/cm$^2$ and free abrasive grains with the average grain size of less than 1.0 μm are used as the abrasive grains. The temperature of the electrolyte is preferably set to lower than 15° C. The polishing material may comprise non-woven abrasive cloth made of ultrafine fibers.

5 Claims, 16 Drawing Sheets

ELECTROLYTIC-ABRASIVE POLISHING METHOD OF ALUMINUM SURFACE

BACKGROUND OF THE INVENTION

1. Field of the Invention

The present invention concerns a method of fabricating an aluminum surface capable of polishing the aluminum surface to a mirror-smooth state at sub-micron accuracy, which is utilized, for example, in the polishing of substrates for magnetic discs or the polishing of polygonal mirrors used in laser printers, etc.

2. Description of the Prior Art

The mirror-smooth fabrication methods for aluminum surfaces that have been put to practical use so far include electrolytic polishing, precise polishing using abrasive grains (i.e., lapping) and mirror finish cutting using a diamond tool (i.e., dia-turn).

Among these methods, the electrolytic polishing utilizes the electrolytic dissolving effect for anode metals (workpieces) and, since even microscopic protrusions can be dissolved, it is excellent in that an extremely smooth surface having mirror-like gloss can be obtained as compared with mechanical polishing. However, since relatively a large degree of unevenness (about 3–6 $\mu$m Rmax) remains, this method involves a drawback of requiring a preceding levelling finishing step to some extent.

On the other hand, in the lapping or dia-turn, such additional levelling is not necessary and the accuracy at the finished surface is 0.2–0.3 $\mu$m Rmax and 0.03 $\mu$m Rmax degree respectively. Since less than 0.1 $\mu$m Rmax of accuracy is necessary for the finished surface of magnetic discs of high memory capacity (10 MB/in$^2$.) or the polygonal mirrors, the dia-turn method will become important in the fabrication of substrates for the magnetic discs, etc.

However, the dia-turn method has the following problems.

(I) Since the mechanical accuracy of a machine tool has a direct effect on the fabrication accuracy of a workpiece, it is necessary to maintain the mechanical accuracy and the required accuracy therefor is, for example, as high as less than 1 $\mu$m.

(II) Since the setting accuracy of a diamond tool has a significant effect on the fabrication accuracy of a workpiece, considerable skill is required for the setting of the tool.

(III) Residual stresses generated in the workpiece is increased by the dia-turn cutting.

A method referred to as an electrolytic-abrasive polishing or electrolytic lapping has recently been developed as a method of applying mirror-smooth surface fabrication to stainless steels and ordinary steels. In this surface fabrication method, superfine fabrication is applied by combining the electrolytic anode dissolving effect and the polishing effect of removing protruded portions of passivative films formed at the surface to be fabricated by lapping with abrasive grains. Such a surface fabrication method can eliminate the drawbacks in the dia-turn method described above.

Referring to the electrolytic-abrasive polishing, conditions therefor have already been proposed for stainless steels and ordinary steels, capable of applying mirror-smooth fabrication as fine as the surface roughness of 0.01 $\mu$m Rmax. However, conditions for the mirror-smooth fabrication of aluminum surface have not yet been proposed. The principal reason why such fabrication conditions have not yet been proposed for the aluminum material lie in the following points:

(I) Since the passivation region of aluminum is narrower as compared with that of stainless steels, the proper setting for the electrode voltage is difficult.

(II) Since the surface of aluminum material is softer as compared with stainless steels, the proper setting (III) In addition, since pits tend to be formed due to the effects of inter-metallic compounds in aluminum, the conditions for the mirror-smooth polishing have not yet been proposed from this point of view.

In the composite electrolytic mirror-smooth fabrication, super finishing is applied to the surface to be fabricated by urging an abrasive head, which comprises an electrode secured to a rotary shaft and an abrasive cloth covering a buffer member secured to the lower end face of the electrode, under rotation to the surface to be fabricated under a predetermined urging pressure while supplying an electric current between the electrode and the surface to be fabricated. In order to attain the mirror-smooth surface, it is important to uniformly exert the predetermined urging pressure to the surface to be fabricated.

As the method capable of making the urging pressure uniform, there has been proposed a method of using an abrasive material in which abrasive grains are retained with viscoelastic material (refer to Japanese Patent Laid-Open no. Sho 58-137525) or a method of disposing a buffer member made of elastic material between an abrasive cloth and the electrode (refer to Japanese Patent Publication No. Sho 58-19412 and Japanese Patent Laid-Open No. Sho 56-139699). In this case, non-woven fabrics are usually used for the abrasive cloth and the buffer member since it is required, if free abrasive grains are used in the electrolyte, that the electrolyte and the abrasive grains should be permeated therethrough and in view of securing the working life of the abrasive cloth.

In the above-mentioned patent literatures, it has been described, for example, that a surface fabrication with the roughness of less than several tens of nm Rmax is possible in a case where the work is, for example, austenite stainless steels having a surface hardness as high as HV 200.

However, in the conventional composite electrolytic mirror-smooth fabrication, although a satisfactory mirror surface can be obtained for the workpiece having a high surface hardness, it is difficult to apply mirror-smooth fabrication to a surface roughness of less than 0.1 $\mu$m Rmax in the case of soft material such as aluminum having a surface hardness as low as HV 70 since scratches are liable to be formed at the surface to be fabricated.

OBJECT OF THE INVENTION

Accordingly, it is a first object of the present invention to find suitable conditions for the mirror-smooth fabrication of an aluminum surface in a method of fabricating an aluminum surface by electrolytic-abrasive polishing.

It is a second object of the present invention o propose fabrication conditions capable of preventing the formation of pits in the method of fabricating an aluminum surface by composite electrolytic polishing.

It is a third object of the present invention to provide a method of composite electrolytic mirror-smooth fabrication for an aluminum surface capable of applying a surface fabrication to the surface of aluminum or aluminum alloy to be fabricated with a surface roughness of less than 0.1 μm Rmax while preventing the occurrence of scratches.

SUMMARY OF THE INVENTION

The first object of the present invention can be attained by a method of fabricating aluminum surface for applying a mirror-smooth fabrication to the surface of aluminum material or aluminum alloy by combining an electrolytic anode dissolving effect to the surface and a polishing effect of removing the protruded portions of passivative films formed on the surface to be fabricated by way of lapping with abrasive grains, wherein the voltage between the aluminum material and a tool electrode is set within $2.1 \pm 0.3$ V, sodium nitrate ($NaNO_3$) or the like at less than 10% concentration is used as the passivation type electrolyte such solution, the urging pressure of the tool electrode to the surface to be fabricated is set to be less than 2.0 kgf/cm$^2$, and free abrasive grains with an average grain size of less than 1.0 μm are used as the abrasive grains.

Since the voltage for the passivation region is narrow in the aluminum material as compared with that in other materials, it is desired that the voltage between the aluminum material and the tool electrode is set near the voltage value for the passivation region. This voltage value for the passivation region is inherent to aluminum and does not depend on the concentration of the electrolyte. However, if the electrolyte concentration is high, it is desirable that the voltage is set to somewhat lower as compared with the case of using a thinner electrolyte.

Further, since the electrical resistance value of the electric path varies depending on the apparatus, it is necessary to adjust the power source voltage by controlling the voltage value for the power source on every apparatus so that an adequate passivative voltage is applied between the tool electrode and the aluminum material.

Further, since the aluminum surface is softer as compared with other material, the proper setting for the lapping conditions is difficult, and an improvement in the lapping accuracy is not expected so much by the use of the abrasive cloth. However, the Rmax value can be improved remarkably by using free abrasive grains with the average grain size of less than 1.0 μm.

Since the free abrasive grains are used, the concentration of the electrolyte is desirably thinner as compared with the case of using the abrasive cloth. It is usually less than 10%, and it is desirably about 5%. The concentration in the case where using an abrasive cloth is desirably about 13%. It is considered that the difference of the electrolyte concentration between the cases of using the abrasive cloth and the electrolyte is attributable to the balance between the lapping amount of the abrasive grains and the amount of electrolysis.

The urging pressure is expressed as the urging force detected by a load cell disposed to the bottom of an aluminum plate mathematically divided by the area of the tool electrode. Since free abrasive grains are used, an urging pressure is required to some extent, but it is desirably less than 2.0 kgf/cm$^2$ since an excessive force will leave frictional traces on the fabricated surface.

Since the predetermined conditions in the electrolytic-abrasive polishing for aluminum are experimentally determined, it is possible to apply a mirror-smooth fabrication to aluminum. In this case, since the region capable of fabrication is proportional to the area of the tool electrode, the polishing speed can easily be increased by enlarging the surface of the tool electrode. Further, since the polishing principle is quite different from that of the conventional dia-turn system, the mechanical accuracy can be low, no particular skill is required for the setting of the tool, and the cost can be reduced a large amount.

The foregoing second object can be attained by a method of fabricating an aluminum surface for applying mirror-smooth fabrication to the surface of aluminum or aluminum alloy to be fabricated by combining an electrolytic anode dissolving effect for the surface and a polishing effect of removing the protruded portions of passivative films formed on the surface to be fabricated by means of lapping with abrasive grains, wherein the liquid temperature of the electrolyte is set so as to be lower than 15° C.

Since the electrolytic dissolving or leaching intensity for crystallizates can be reduced by maintaining the electrolyte temperature within a certain low level, formation of pits can be reduced so as to remarkably improve the surface roughness.

In the conventional method, non-woven fabrics with no particular definition for the material are used as the abrasive material, and the control for the urging pressure is not adequate. Because of this the urging pressure is increased locally to cause scratches.

Further, errors in the mechanical accuracy (for example, deflection of the electrode disposed to the rotational shaft in the thrusting direction, the normality of the electrode relative to the surface to be fabricated, protrusions or creases upon mounting of the abrasive cloth, etc.) cause large urging forces locally to the surface to be fabricated, thereby resulting in the formation of scratches.

BRIEF DESCRIPTION OF THE DRAWINGS

These and other object, as well as the features of the present invention, will become apparent by reading the following descriptions for the present invention by way of preferred embodiments illustrated in the accompanying drawings, wherein

FIG. 7 through FIG. 9 are views for explaining the case of second invention in which FIG. 7 is a characteristic diagram illustrating the relationship between the electrolyte temperature and surface roughness;

FIG. 9 is a diagram illustrating the relationship between the electrolyte temperature and the dissolving intensity;

FIGS. 16 through 18 are diagrams for explaining the principle of the third invention, in which FIG. 16 is a characteristic diagram showing the relationship between the fiber diameter and the surface roughness;

FIG. 17 is a characteristic diagram showing the relationship between the electrode urging pressure and the surface roughness and FIG. 18 is a characteristic diagram showing the relationship between the electrode gap and electrode urging pressure;

FIGS. 19 through 21 show a device for practicing the method of the third invention, in which FIG. 19 is a cross sectional view of a polishing head, FIG. 20 is a cross sectional bottom view for the tool electrode, and FIG. 21 is a front elevational view for the surface fabrication device;

DESCRIPTION OF PREFERRED EMBODIMENTS

Figure 1:
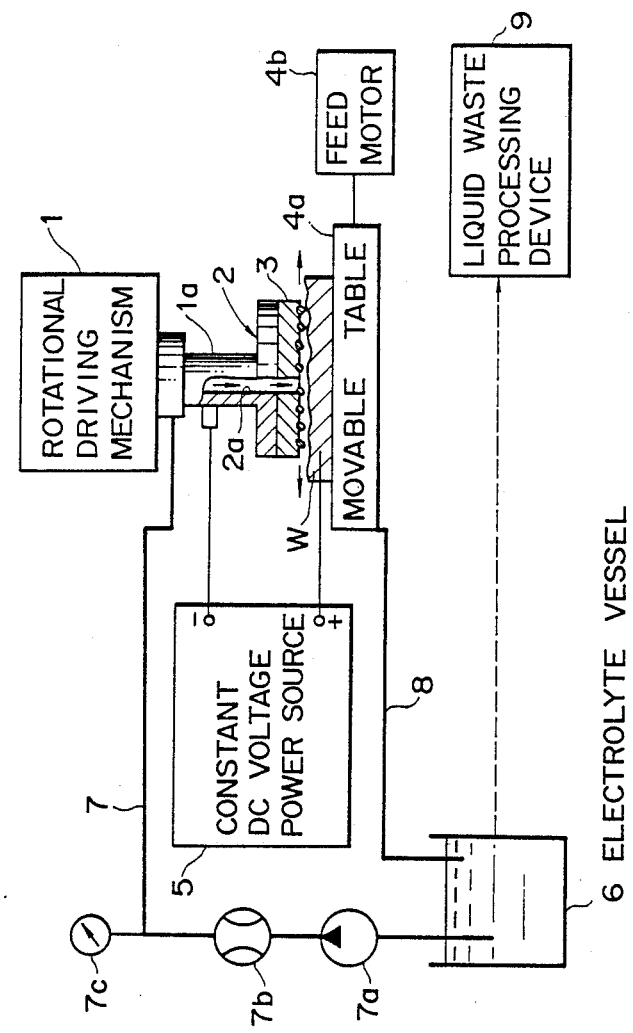
FIG. 1 is a schematic constitutional view of a surface fabrication device for practicing the method according to the first invention.
Figure 2:
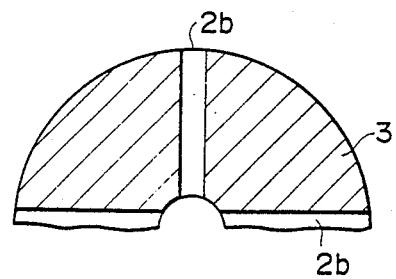
FIGS. 2 and 3 are, respectively, a plan view and a side elevational view for the tool electrode used therein.
Figure 3:
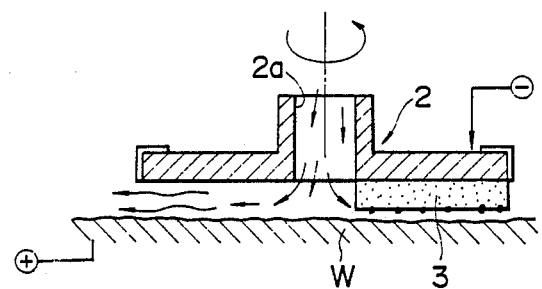
Figure 4:
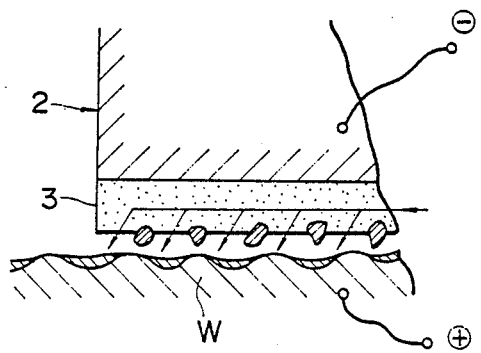
FIG. 4 is an enlarged view for a main portion of the tool electrode.

The present inventions will be described more specifically referring to the accompanying drawings.

The First Embodiment

FIG. 1 through FIG. 4 illustrate the surface fabrication device for practicing the method according to the first invention.

In FIGS. 1-4, a rotational driving mechanism 1 is disposed for rotationally driving a rotational shaft 1a and applying a predetermined urging pressure in the vertical direction.

A tool electrode 2 is attached to the lower end of the rotational shaft 1a of the rotational driving mechanism 1. The tool electrode 2 is in a disc-like shape and has a water-permeable and viscoelastic abrasive material 3 appended at the lower surface thereof. An electrolyte jetting port 2a is formed in the tool electrode 2, and four exposed portions 2b are formed radially from the center at the lower surface of the electrode 2, and the exposed portions 2b constitute an electrode (cathode).

A movable table 4a is disposed below the tool electrode 2, and the table 4a is reciprocated by a feed motor 4b leftwardly and rightwardly in the drawing. As a workpiece, an aluminum plate W is placed in this case on the upper surface of the movable table 4a.

A constant DC voltage power source 5 is disposed and the anode terminal thereof is connected to the aluminum plate W, while the cathode terminal thereof is connected with the tool electrode 2, so that a constant DC voltage is applied between the tool electrode 2 and the aluminum plate W. An electrolyte vessel 6 contains an aqueous solution of sodium nitrate (neutral salt) as a passivation type electrolyte, and free abrasive grains are disposed therein. An electrolyte supply channel 7 is connected to the electrolyte vessel 6 for supplying the electrolyte between the abrasive material 3 and the aluminum plate W. A supply pump 7a, a flow meter 7b and a pressure gage 7c are disposed at the midway of the supply channel 7. The electrolyte is supplied from the electrolyte vessel 6 by way of the supply channel 7 and fed through the electrolyte jetting port 2a in the tool electrode 2 to between the abrasive material 3 and the aluminum plate W and, further, returned by way of the return channel 8 to the vessel 6. A liquid waste processing device 9 is disposed.

Explanation will now be made of practicing the method of fabricating an aluminum surface in this illustrated embodiment according to the first invention.

An aluminum plate W with a substrate accuracy (surface roughness) from 0.2-0.3 $\mu$m Rmax is used as the workpiece and is attached on the movable table 4a. The fabrication conditions are set as below: 5 wt % for the concentration of the electrolyte $NaNO_3$, 2.1 V for the voltage between the tool electrode 2 and the aluminum plate W (voltage at the power source: 4.2 V), 0.04–0.05 $A/cm^2$ for the current density and 1.0 $kgf/cm^2$ for the urging pressure of the tool electrode 2. The tool electrode 2 is rotated by the rotary driving mechanism 1 at 750 rpm and the movable table 4a is reciprocated for four times at the feeding speed of 55.6 mm/min.

Figure 5A:
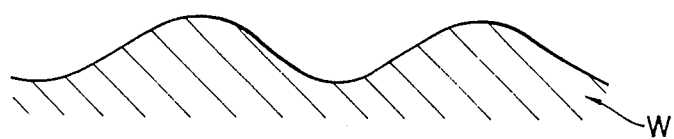
FIGS. 5(a) through 5(e) are views illustrating the fabrication step.
Figure 5B:
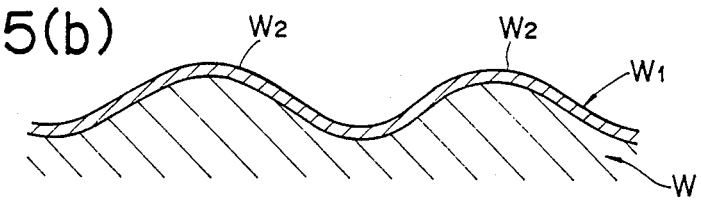
Figure 5C:
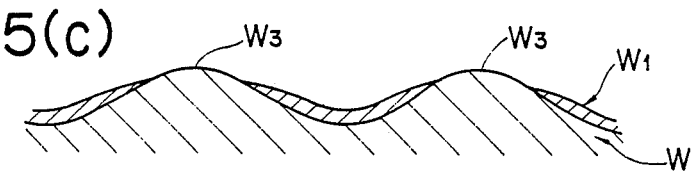
Figure 5D:
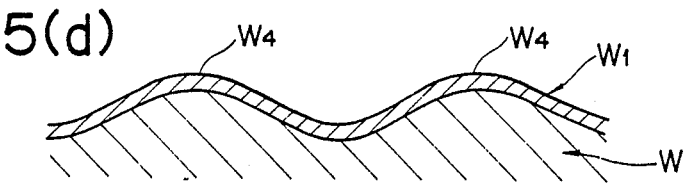
Figure 5E:
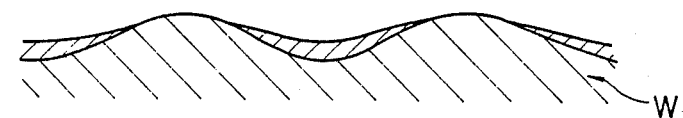

Referring briefly to the polishing step for the aluminum plate W in conjunction with FIG. 5, a passivative film W1 is formed at the substrate surface of the aluminum plate W due to the electrolytic effect by the current and the electrolyte (refer to FIGS. 5(a), (b)) and then the protruded portions W2 of the passivative films are removed by the polishing effect due to the lapping action of the abrasive grains along with the rotation of the tool electrode 2 to expose the protruded surface W3 of the aluminum plate W (FIG. 5(c)) Further, passivative films W4 are newly formed under the electrolytic effect to the portions from which the passivative films of the aluminum plate W have been removed (FIG. 5(d)), the portions W4 are again removed by the lapping action, and the protruded portions of the aluminum plate W are levelled by repeating both the above-mentioned effects (FIG. 5(e)).

Figure 6:
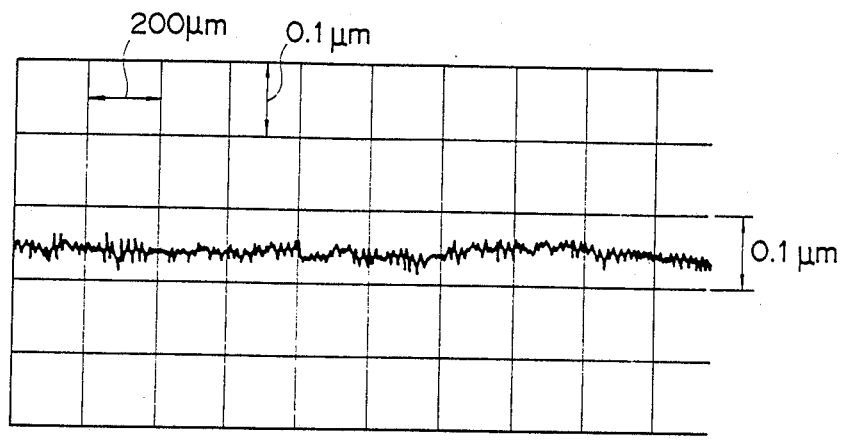
FIG. 6 is a diagram illustrating the profile of the fabricated surface.
Figure 7:
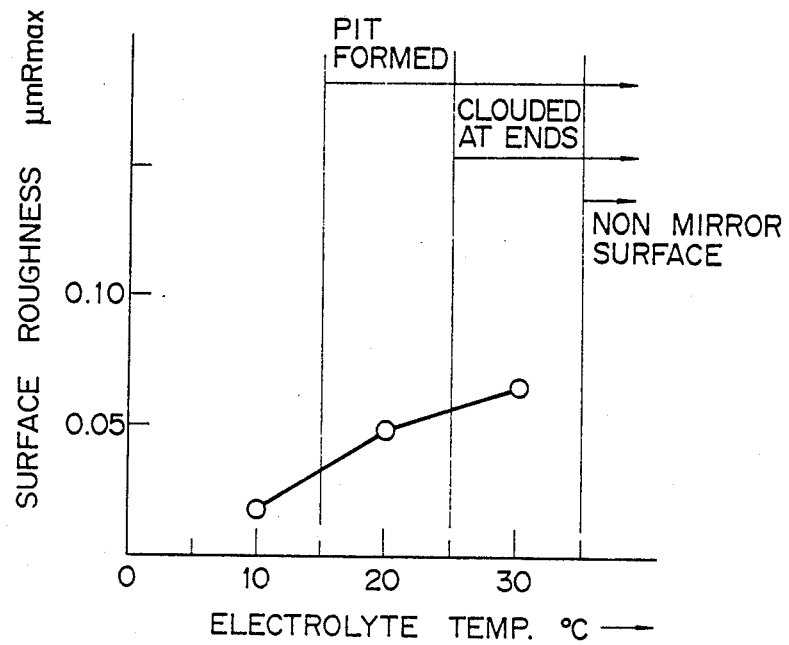

The result of the surface polishing for the aluminum plate W obtained in this way is shown in FIG. 6. As can be seen from this Figure, the surface accuracy (roughness) is 0.03 $\mu$m Rmax in this embodiment, and it is improved by about 10 times as compared with the initial substrate accuracy of from 0.2 to 0.3 $\mu$m Rmax.

The method of fabricating the aluminum surface according to this invention has the following merits as compared with the dia-turn method which is the conventional method for fabricating aluminum surface:

(I) Since the size of the region of a workpiece that can be fabricated at once is in proportion with the size of the electrode surface of the tool electrode 2 in this invention, the polishing speed can easily be increased by enlarging the tool electrode 2.

(II) Since the mechanical accuracy required for the machine tool itself is as low as about 40 $\mu$m, a machine tool such as a general purpose boring machine may be used, thereby enabling a reduction in cost.

(III) No particular skill is required for setting the tool.

(IV) The running cost is inexpensive, since general abrasive grains are used in the method of this invention, whereas natural single crystal diamonds have been used as the tool in the dia-turn system for instance.

Although the explanation has been made to this invention in the case of setting the voltage between the tool electrode and the aluminum plate at 2.1 V, the current density at 0.04–0.05 A/cm$^2$, the electrolyte concentration to 5%, urging pressure of 1.0 kgf/cm$^2$ and abrasive grain size of 0.3 μm, the respective fabrication conditions are not restricted only thereto in the method of fabricating aluminum surface according to this invention. The conditions can properly be selected—e.g., the voltage between the tool electrode and the aluminum plate of within 2.1+0.3 V, the electrolyte concentration of less than 10%, the urging pressure of less than 2.0 kgf/cm$^2$, the abrasive grain size of less than 1.0 μm, and the mirror-smooth fabrication to the aluminum surface is possible by setting such fabrication conditions.

As has been described above, by the method of fabrication for aluminum surface according to this invention since the voltage between the tool electrode and the aluminum plate is set to within 2.1±0.3 V, NaNO$_3$ solution of less than 10% is used as the electrolyte, the urging pressure is set to less than 2.0 kgf/cm$^2$ and the free abrasive grains of 1.0 μm is used as the abrasive grains, it can provide mirror-smooth fabrication for aluminum surface in which the polishing speed can greatly be improved and the accuracy for the machine tool itself can be improved as compared with that for the conventional dia-turn system to attain the effect of cost reduction.

The Second Embodiment

A description is made next to the method of fabricating aluminum surface according to the second invention referring to FIG. 7 through FIG. 15.

The present inventors have made a study on a pit forming state for obtaining conditions capable of preventing undesirable formation of pits and have found the following. That is, as shown, in example, in FIGS. 10(a) and (b), more intense electrolytic dissolving effect is exerted on the crystallizates 11 such as Mg, Si than on aluminum and, accordingly, only the aluminum portion 11a at the boundary is selectively dissolved, by which crystallizates 11 are protruded outwardly and then separated from the surface leaving traces as a pit 11b. The present inventors have found that the dissolving effect is substantially in proportion with the temperature of the electrolyte, as a result of experimentation, and have accomplished the second invention on the basis that the formation of the pit 11b can be prevented by controlling the temperature of the electrolyte to a certain range.

Figure 8A:
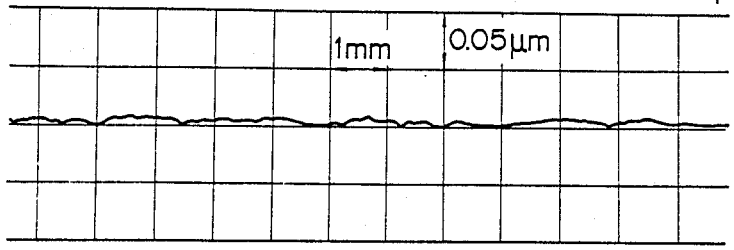
FIGS. 8(a), (b) and (c) are, respectively, diagrams showing the relationship between the electrolyte temperature and pits.
Figure 8B:
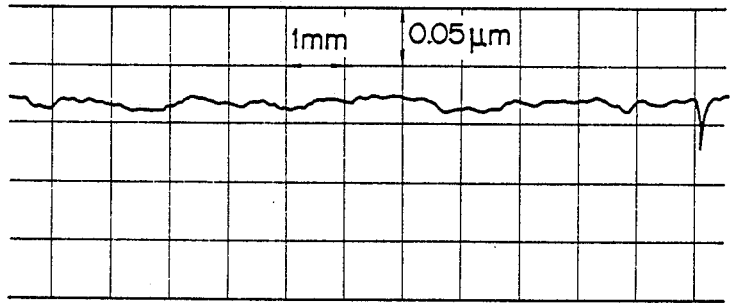
Figure 8C:
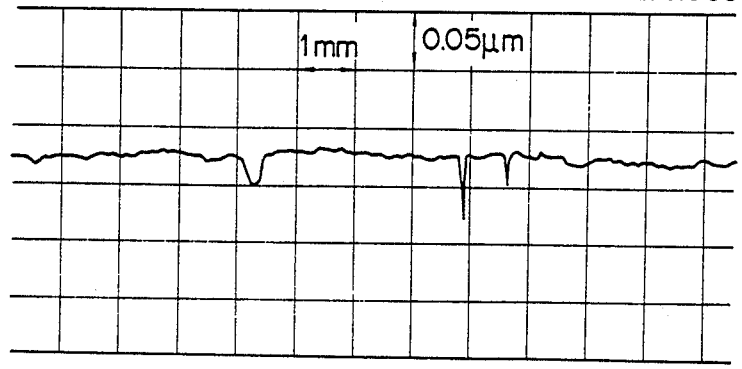

As can be seen from FIGS. 8(a), (b), (c) showing the relationship between the electrolyte temperature and the state of pitting, the pits are formed when a electrolyte temperature is 20° C. and 30° C. In those cases, the surface roughness was 0.048 and 0.063 μm Rmax respectively. In contrast, pits were not formed at 10° C. and the surface roughness was retained to 0.015 μm Rmax.

Figure 9:
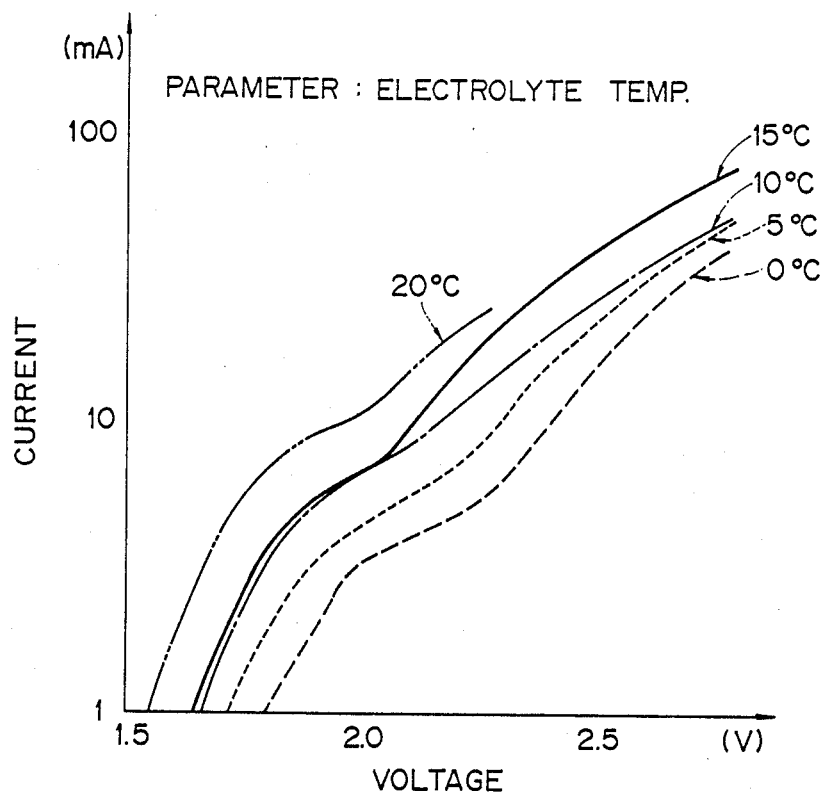
Figure 10A:
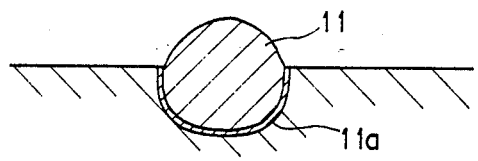
FIGS. 10(a), (b) are views for explaining the state of pit formation.
Figure 10B:
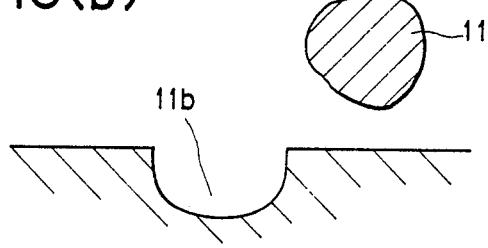
Figure 11:
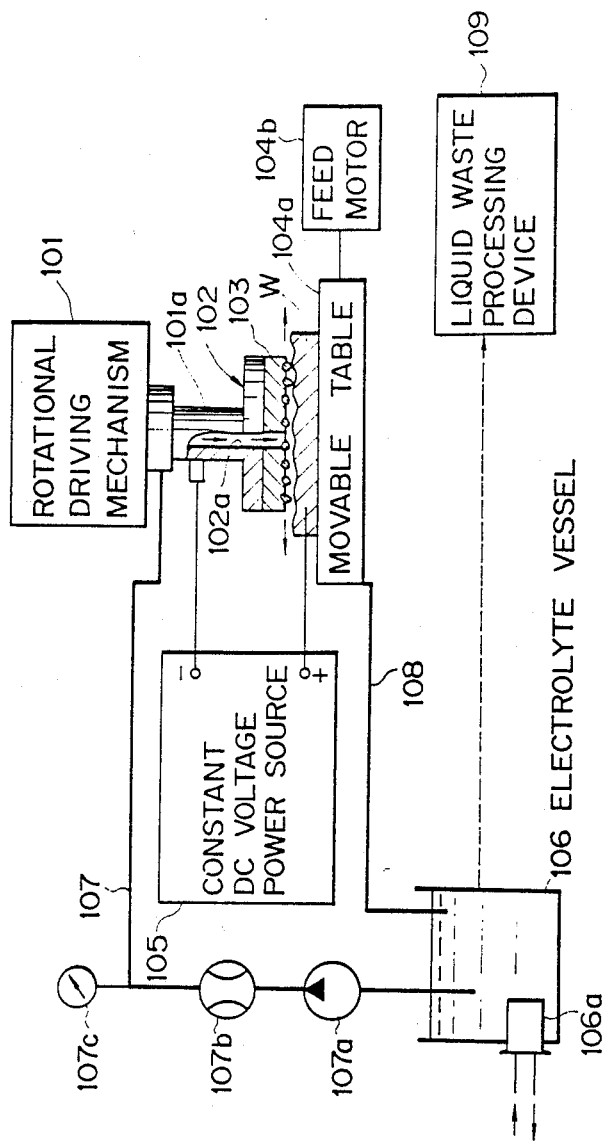
FIG. 11 is a schematic view of the constitution of a surface fabrication device for practicing the method of the second invention.
Figure 12:
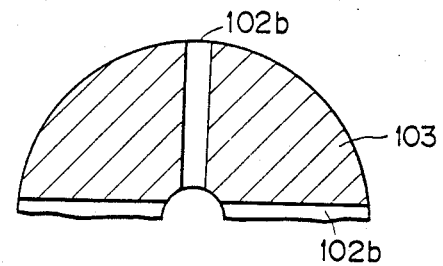
FIGS. 12, 13 are, respectively, a plan view and a side elevational view for a portion of the tool electrode used therein.
Figure 13:
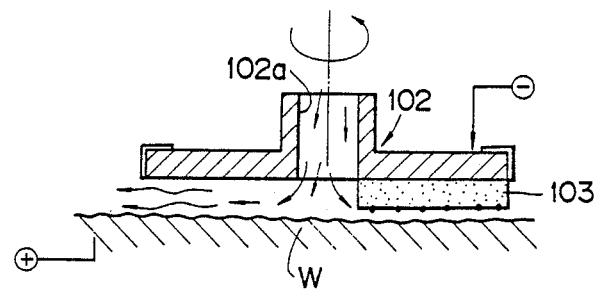
Figure 14:
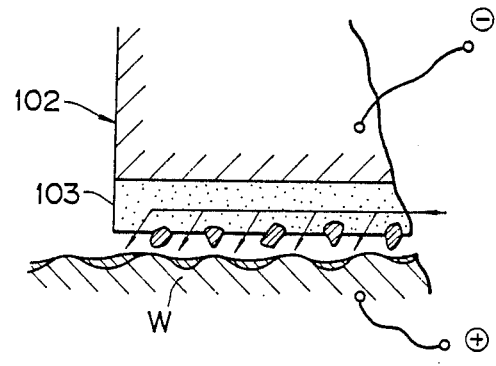
FIG. 14 is an enlarged view for a portion thereof.

Furthermore, as can be seen from FIG. 9 showing the relationship between the electrolyte temperature and the dissolving intensity, the electrolysis current is reduced as the electrolyte temperature is lower. Since the electrolysis current shows the intensity of the dissolving effect, it can be seen that the dissolving intensity is substantially in proportion to the electrolyte temperature.

In the method of fabricating the aluminum surface according to this invention, the electrolyte temperature is maintained at less than 15° C., so that the selective dissolution of aluminum material at the boundary with the crystallizates can be suppressed, thereby preventing the detachment of the crystallizates. Accordingly, the pit formation can be moderated to remarkably improve the surface roughness.

The method of fabricating the aluminum surface according to the second invention will now be explained.

The surface fabrication device used for practicing the method of this invention is substantially the same as that used for practicing of the first invention described above referring to FIGS. 1-4 but wherein the corresponding structure appears in 100 series. In this invention, an aluminum plate W as the magnetic disc substrate has a substrate accuracy (surface roughness) of 0.2–0.3 μm Rmax, which is attached on the movable table 104a. NaNO$_3$ at 3 wt % concentration is used as the electrolyte, and 2.1 V of voltage is applied between the aluminum plate W and the tool electrode 102 with the current density of 5–30 mA/cm$^2$ (3 V for the voltage at power source), under the urging pressure of the tool electrode 102 of from 0.3 to 0.5 kgf/cm$^2$, the rotational speed of the tool electrode 102 of 704 rpm, and the feeding speed of the movable table 104a of 50 mm/min. In this case, the temperature of the electrolyte is maintained at 10° C. by a cooler 106a attached to the electrolyte vessel 106 (shown in FIG. 11).

Figure 15:
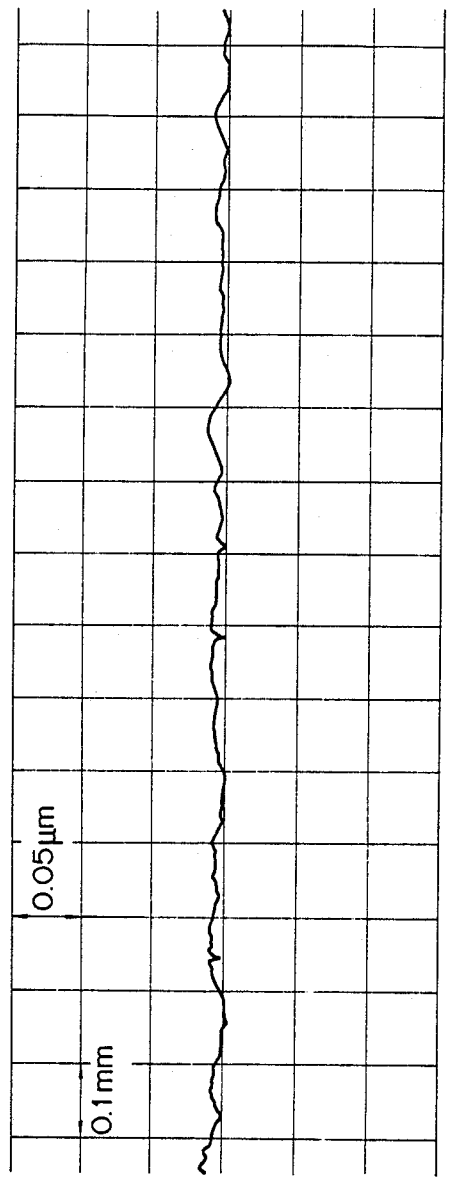
FIG. 15 is a diagram showing the profile of the fabricated surface.

FIG. 15 shows the result of the surface polishing for the aluminum plate W obtained in this manner. As can be seen from the drawing, no pits are formed on the polished surface. The surface roughness is 0.02 μm Rmax, which is an improvement on the order of about 10 times as compared with the substrate roughness of 0.2–0.3 μm Rmax.

In the foregoing embodiment, although an explanation has been made to the case of apply voltage of 2.1 V, current density at 5–30 mA/cm$^2$, electrolyte concentration at 3% and urging pressure from 0.3 to 0.5 kgf/cm$^2$, in the method of fabricating the aluminum surface according to this invention respective fabrication conditions are not restricted only to the foregoing examples but the conditions: current density of less than 0.3 A/cm$^2$, electrolyte concentration of less than 10%, urging pressure of less than 2.0 kgf/cm$^2$, and abrasive grain size of within 1.0 μm may properly be selected. In this case, if the electrolyte temperature is maintained to lower than 15° C., mirror-smooth fabrication for aluminum is enabled.

As has been described above, by the method of fabricating aluminum surface according to this invention, the temperature of the electrolyte is set to less than 15° C. This can provide an effect of remarkably improving the roughness of the polished surface while preventing the occurrence of pits caused by the detachment of crystallizates.

The Third Embodiment

Description is now made of the third invention referring to FIG. 16 through FIG. 25.

Figure 24:
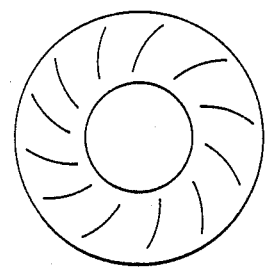
FIGS. 24 and 25 are views illustrating the profiles of scratches formed at the fabricated aluminum surface.
Figure 25:
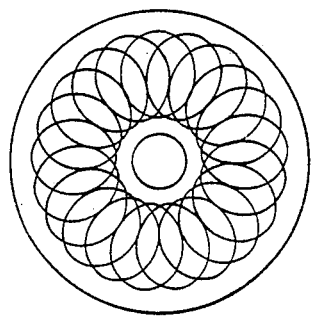

In the conventional method of composite electrolytic mirror-smooth fabrication finishing, while satisfactory mirror-smooth surface can be obtained in a case for a workpiece having a high surface hardness, scratches are liable to be formed at the surface to be treated in a soft material such as aluminum having a surface hardness as low as HV 70 as shown in FIGS. 24, 25.

The present inventors conducted experiments for demonstrating the relationship between the fiber diameter of the non-woven fabrics used as the abrasive material and the surface roughness, and also the relationship between the urging pressure and the surface roughness.

Figure 16:
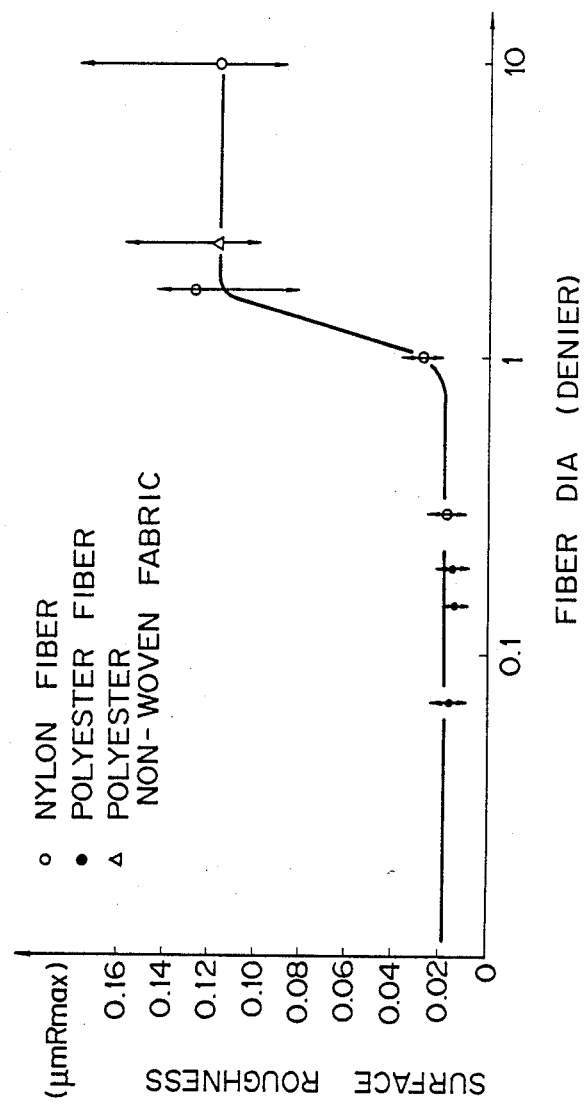

It is apparent from FIG. 16 that the surface roughness is improved as the fiber diameter of the nonwoven abrasive cloth is finer, and the average surface roughness of 0.12 μm Rmax at a fiber diameter in excess of 1-1.5 denier is decreased to 0.02 μm Rmax as the fiber diameter is reduced to less than 1 denier.

Figure 17:
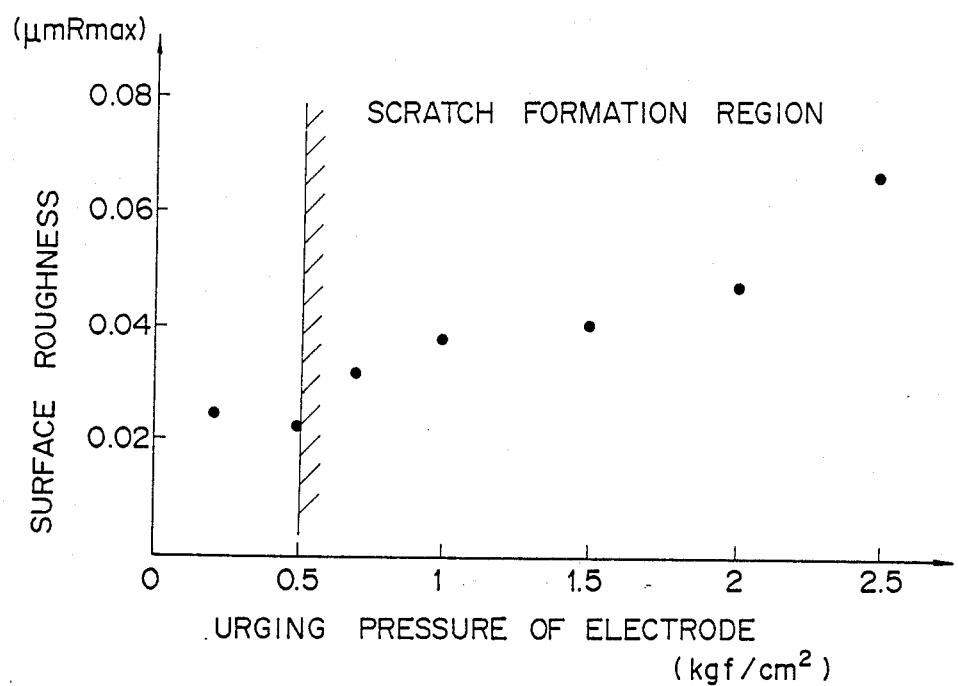

It is also apparent from FIG. 17 that the surface roughness is improved along with a decrease in the urging pressure. Specifically, the roughness is about at 0.02 μm Rmax if the pressure is controlled to less than 0.5 kgf/cm$^2$ indicating that no scratches are formed at the surface to be treated.

It has also been discovered that the average urging pressure undergoes the effect of the electrode gap D (refer to FIG. 19), which is the distance between the lower surface of the electrode and the lower surface of the abrasive cloth.

Figure 18:
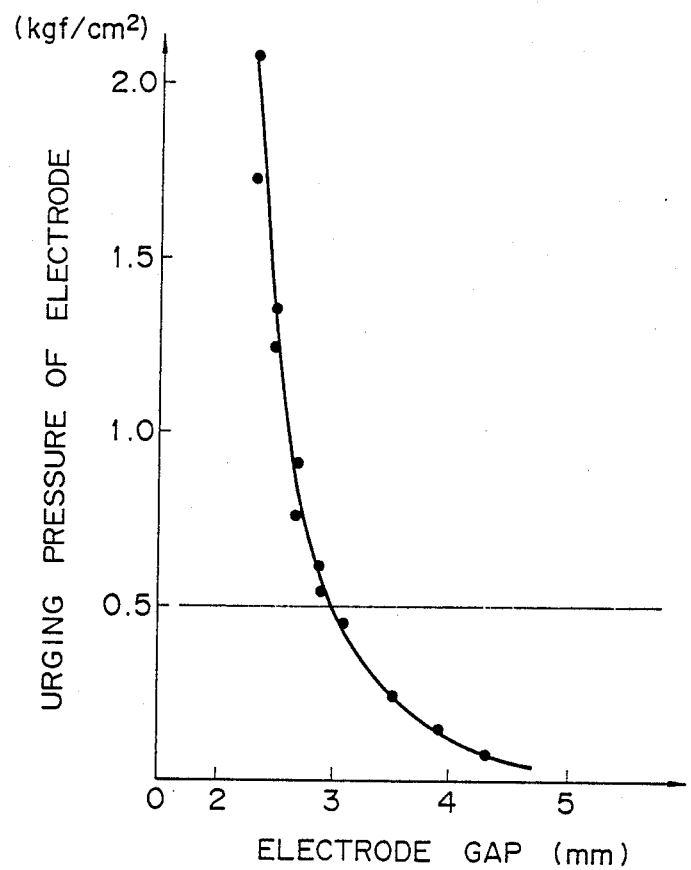

As can be seen from FIG. 18 showing the relationship between the electrode gap and the electrode urging pressure, in a region where the urging pressure is great, the urging pressure changes greatly depending on even a slight error, if any, in the electrode gap.

Figure 19:
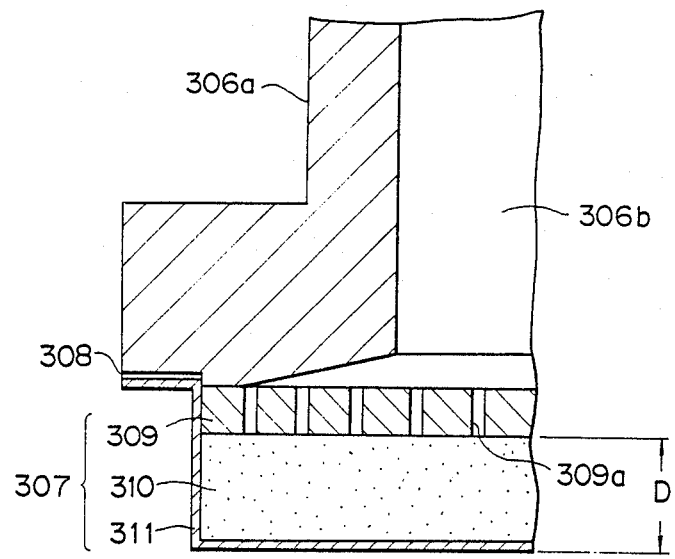
Figure 20:
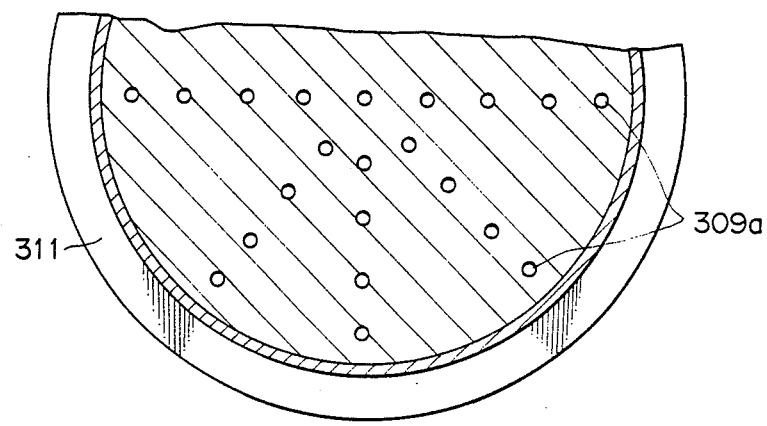
Figure 21:
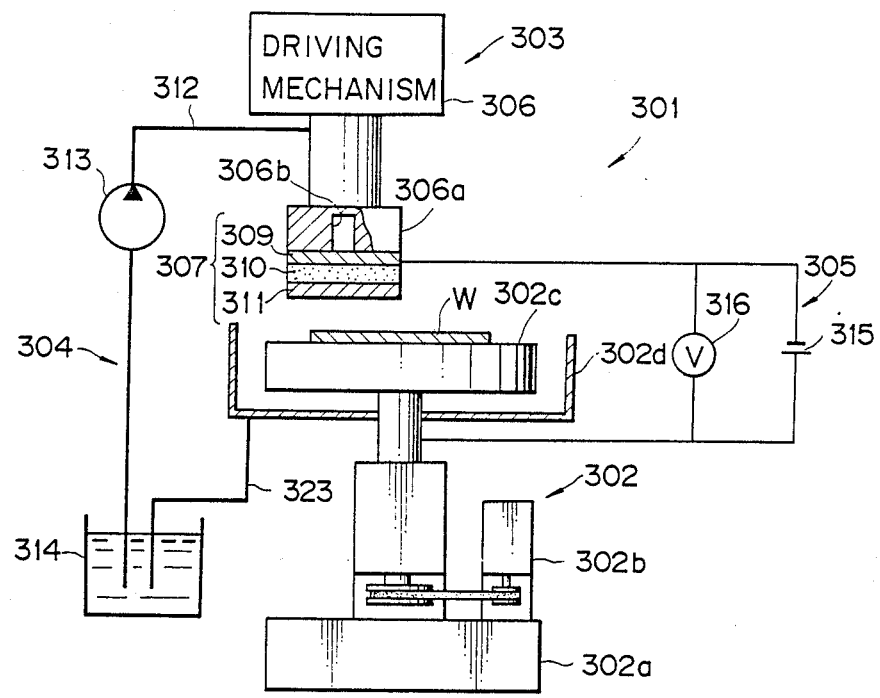

FIG. 19–FIG. 21 show the surface fabrication device for practicing the method according to the third invention. The surface fabrication device 301 in the drawings comprises a table driving device 302, an electrode driving device 303, an electrolyte supply device 304 and a current supply device 305.

The table driving device 302 is so adapted that it drives a bed 302a by a driving motor (not illustrated) rightwardly and leftwardly in the drawing (FIG. 21) and that it rotates a rotary table 302c with a driving motor 302b. An electrolyte receptacle 302d is disposed below the rotary table 302g. As a workpiece, an aluminum disc W of aluminum alloy is disposed in this case to the upper surface of the rotary table 302c.

The electrode driving device 303 is disposed above the rotary table 302c, and the device 303 is so adapted that it can rotationally drive a rotational shaft 306a by a driving mechanism 306 and that it can exert a predetermined urging pressure in the vertical direction. The rotational shaft 306a has a channel 306b formed therethrough for passing the electrolyte, and an abrasive head 307 is attached at the lower end of the rotational shaft 306a. The abrasive head 307 comprises a tool electrode 309, a buffer member 310 and an abrasive cloth 311. The tool electrode 309 is secured to the lower end of the rotational shaft 306a. Upon securing the electrode 309 to the rotational shaft 306a, the occurrence of errors in the mechanical accuracy are considered. That is, deflection in the thrusting direction and error in the normality relative to the upper surface of the disc W are previously determined and adapted under control such that the urging pressure does not exceeds 0.5 kgf/cm$^2$ even at the maximum error.

The tool electrode 309 is in a disc-like shape acting as an electrode (cathode) to which a plurality of electrolyte jetting ports 309a are perforated radially passing through from the upper to the lower surfaces (FIGS. 19 and 20). Further, the buffer member 310 is disposed on the lower surface of the tool electrode 309, the abrasive cloth 311 is further disposed to so as to cover the buffer member 310, and the peripheral portion of the abrasive cloth 311 is secured by means of adhesives 308 to the tool electrode 309 and the rotational shaft 306a.

The buffer member 310 is made of non-woven fabrics of polyester and the abrasive cloth 311 comprises artificial polyester, leather using ultrafine fibers with the fiber diameter of less than 1 denier. The abrasive cloth 311 is press-molded from commercially available sheet-like products while profiling a outer shape of the buffer member 310, with which the protrusion or creases upon mounting the abrasive cloth 311 are eliminated. The abrasive cloth 311 and the buffer member 310 have a nature of allowing the electrolyte and the abrasive grains to permeate therethrough as described later.

An electrolyte vessel 314 of the electrolyte supply device 304 contains therein NaNO$_3$ as the passivation type electrolyte and free abrasive grains. The abrasive grains are composed of alumina and have an average grain size of 0.5 μm. The electrolyte vessel 314 is connected by way of an electrolyte channel 312 to the electrode driving device 303, and a supply pump 313 is disposed midway of the electrolyte channel 312. In this manner, the electrolyte is supplied through the electrolyte channel 312, by way of the channel 306b in the rotational shaft 306a, and from the electrolyte jetting ports 309a of the tool electrode 309 to a position between the abrasive cloth 311 and the aluminum disc W, is stored in the electrolyte receptacle 302d and further returned to the vessel 314 passing through a returning channel 323. Further, a constant DC voltage power source 315 of the current supply device 305 is connected at the anode terminal thereof to the aluminum disc W by way of the rotary table 302c, whereas at the cathode terminal thereof with the tool electrode 309. A constant DC voltage is applied between the tool electrode 309 and the aluminum disc W. A voltmeter 316 is disposed for measuring the voltage between both of the electrodes.

Description is to be made for the case of applying composite electrolytic mirror-smooth polishing for aluminum surface in one embodiment according to the third invention by using the surface fabrication device.

In this embodiment, the aluminum disc W was placed to the upper surface of the rotary table 302c of the surface fabrication device 301, and the abrasive cloth 311 is urged with an urging pressure in the axial direction by the electrode driving device 303. In this fabrication process, ultrafine fibers with the fiber diameter of less than 1 denier are used for the abrasive cloth 311 of the abrasive head 307 as described above, whereas the urging pressure of the abrasive head 307 to the surface to be fabricated is controlled to less than 0.5 kgf/cm$^2$.

The function and the effect of the present embodiment will be explained next.

In the case of applying mirror-smooth polishing to soft material such as aluminum, it is necessary to control the urging pressure to less than a predetermined value (for example, less than 0.5 kgf/cm$^2$), so that no large pressing force is exerted locally. Since artificial leather made of ultrafine polyester fibers with the fiber diameter of less than 1 denier is used as the abrasive cloth in this embodiment, the bending rigidity per unit fiber is reduced, locally high urging pressure does not occur so often, and scratches to the surface to be fabricated can be prevented. Furthermore, even if the urging pressure should be increased locally, abrasive grains can be released since the fiber rigidity is low, and it is also possible to moderate the biting of the abrasive grains to the surface to be fabricated.

Further, in this embodiment, the deflection in the thrusting direction due to the error of the mechanical accuracy and the normality with respect to the surface to be fabricated of the electrode are previously measured for reducing the urging pressure to less than 0.5 kgf/cm², the electrode is so disposed that the pressure does not exceed 0.5 kgf/cm² even upon maximum error, and commercially available sheet-like abrasive cloth is press-molded profiling the buffer member and mounted. Accordingly, it is possible also in this view point to present the local urging pressure from increasing, thereby avoiding the occurrence of scratches. This enables one to fabricate aluminum to a mirror-smooth surface of less than 0.1 μm Rmax.

Figure 22:
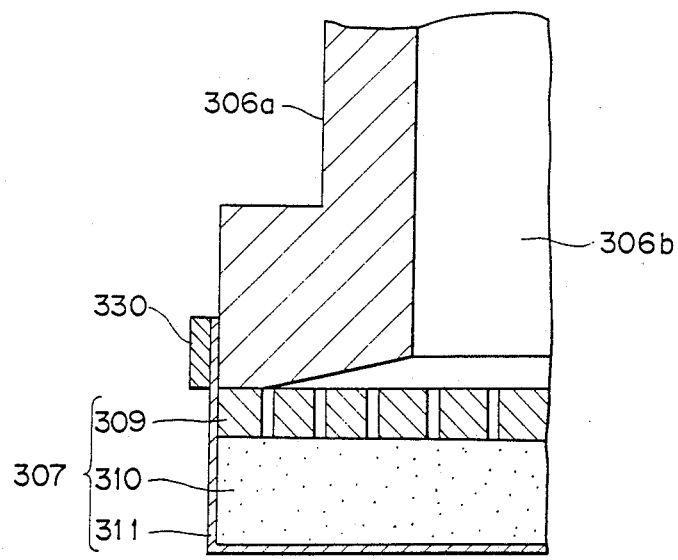
FIGS. 22 and 23 are, respectively, cross sectional views of polishing heads illustrating further embodiments.
Figure 23:
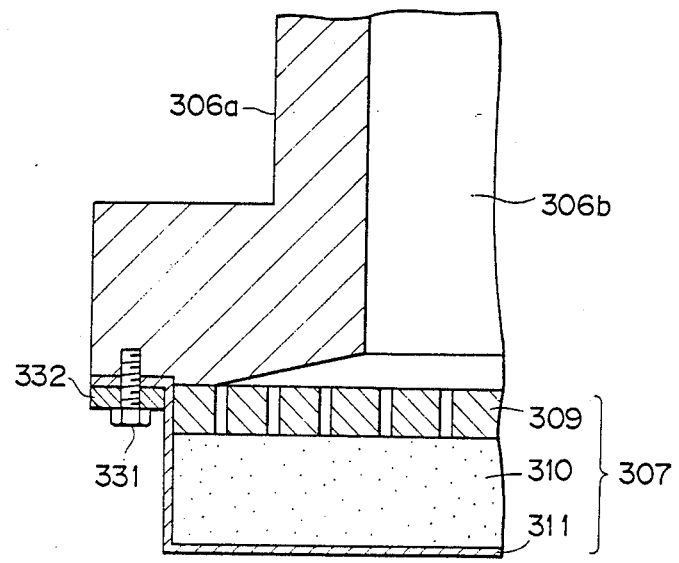

In the foregoing embodiment, although the abrasive cloth is secured with the adhesives to the tool electrode, it may be secured as shown in FIGS. 22 and 23 by means of a hose belt 330 or a retainer plate 332 and a bolt 331.

As has been described above by the method of applying composite electrolytic mirror-smooth fabrication, since the abrasive cloth made of a non-woven sheet of ultrafine fibers, and since the urging pressure is controlled within a range of 0.5 kgf/cm², it is possible to prevent scratches and apply mirror-smooth super finishing to aluminum surface with less than 0.1 μm Rmax.

Obviously, numerous modifications and variations of the present invention are possible in light of the above teachings. It is therefore to be understood that, within the scope of the appended claims, the invention may be practiced otherwise than as specifically described herein.

What is claimed is:

1. A method of fabricating an aluminum surface for applying mirror-smooth fabrication to the surface of aluminum or aluminum alloy by combining an electrolytic anode dissolving effect to said surface and a polishing effect of removing the protruded portions of passivated films formed on said surface to be fabricated by lapping with abrasive grains, setting the voltage between the aluminum material and the tool electrode to within 2.1±0.3 V, utilizing an electrolyte at less than 10% concentration as a passivation type electrolyte, setting the urging pressure of the tool electrode to the surface to be fabricated to less than 2.0 kgf/cm² and using free abrasive grains with the average grain size of less than 1.0 μm as said abrasive grains.

2. A method of fabricating an aluminum surface for applying mirror-smooth fabrication to the surface of aluminum or aluminum alloy by combining an electrolytic anode dissolving effect to said surface and a polishing effect of removing the protruded portions of passivated films formed on said surface to be fabricated by lapping with abrasive grains, and setting the temperature of the electrolyte to lower than 15° C.

3. A method of applying composite electrolytic mirror-smooth fabrication to the surface of aluminum or aluminum alloy by urging an abrasive head which comprises securing an electrode to a rotational shaft and appending an abrasive cloth to the lower end face of said electrode by way of a buffer member under a predetermined axial urging pressure during rotation, wherein the abrasive cloth comprises a non-woven fabric sheet made of ultrafine fibers and which comprises controlling the urging pressure within a range not exceeding 0.5 kgf/cm².

4. A method of fabricating an aluminum surface for applying mirror-smooth fabrication to the surface of aluminum or aluminum alloy by combining an electrolytic anode dissolving effect on said surface and a polishing effect of removing protruding portions of passivated films formed on said surface by lapping with abrasive grains, said method comprising the steps of:
(a) setting the voltage between the aluminum material and the tool electrode to within 2.1±0.3 V;
(b) utilizing an electrolyte at less than 10% concentration as a passivation type electrolyte;
(c) setting the urging pressure of the tool electrode to the surface to be fabricated to less than 2.0 kgf/cm²;
(d) using free abrasive grains with an average grain size of less than 1.0 μm as said abrasive grains; and
(e) setting the temperature of the electrolyte to lower than 15° C.

5. A method of applying composite electrolytic mirror-smooth fabrication to the surface of aluminum or aluminum alloy by urging an abrasive head against said surface, said method comprising the steps of:
(a) securing an electrode to a rotational shaft;
(b) appending an abrasive cloth to the lower end face of said electrode by way of a buffer member under a predetermined axial urging pressure during rotation, the abrasive cloth comprising a non-woven fabric sheet made of ultra fine fibers;
(c) controlling the urging pressure within a range not exceeding 0.5 kgf/cm²; and
(e) setting the temperature of the electrolyte to lower than 15° C.

* * * * *